April 29, 1958  B. L. GARDNER  2,832,521
ARTICLE CARRIER
Filed April 15, 1957
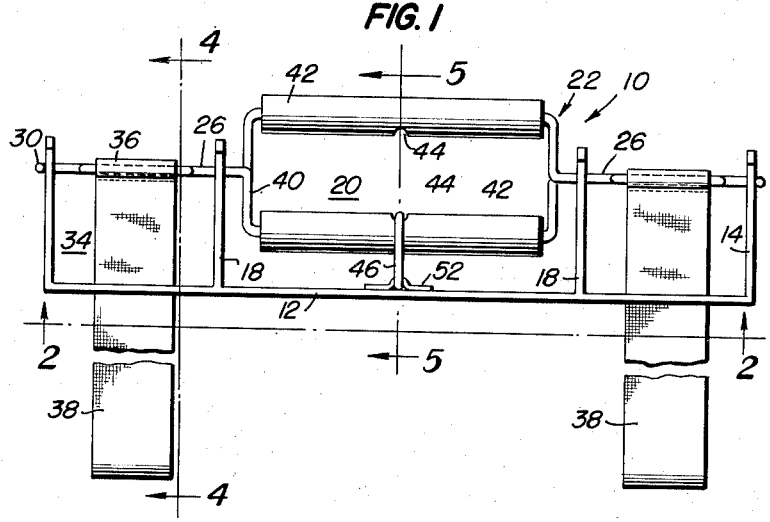
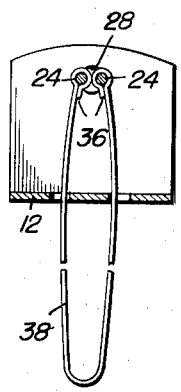
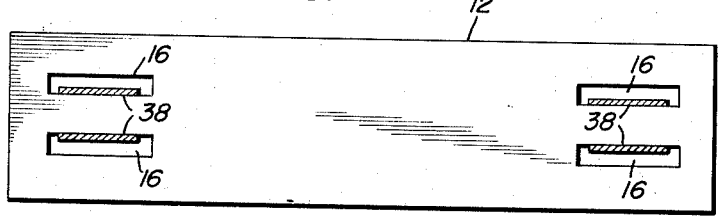
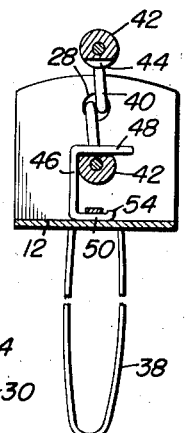
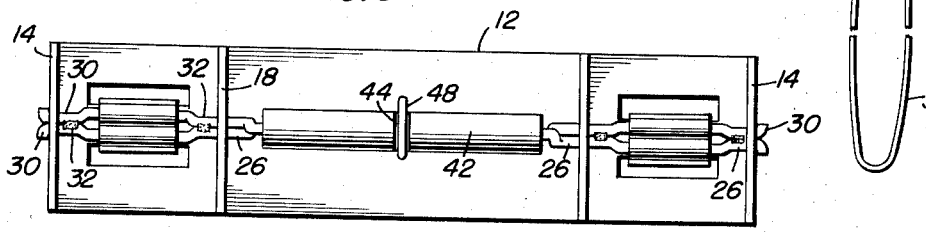
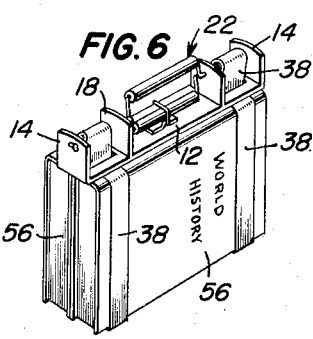
INVENTOR
Bertha L. Gardner
ATTORNEY United States Patent Office 2,832,521
Patented Apr. 29, 1958

2,832,521

ARTICLE CARRIER

Bertha L. Gardner, Pulaski, Tenn.

Application April 15, 1957, Serial No. 652,935

2 Claims. (Cl. 224—54)

This invention relates to an article carrier, and particularly an article carrier for carrying books and other similar articles conveniently by a handle held in one hand.

A further object of this invention is to provide an article carrier wherein the handle serves as part of a means for tightening a pair of straps about one or more books or other similar article so as to carry the books or other articles in a convenient package in one hand.

Still a further object of this invention is to provide an article carrier for a plurality of books or other similar articles wherein there is a handle member and a cooperating means whereby the handle member serves both as a means for tightening the straps about the series of books or other articles and as a means for holding the strap in tightened position while also serving as a convenient handle and hand grip for carrying the same.

Still a further object of this invention is to provide an article carrier wherein a handle is rotatable to tighten a pair of straps about the article, and wherein there is provided an improved handle holding and arrestor means for holding the handle in its rotated position with the straps tightened and convenient for carrying.

In brief, this article carrier includes a base member having a pair of upstanding plates at each end thereof providing a strap compartment, the base plate or member being provided with a pair of parallel slots in each strap compartment so that a loop strap may extend therethrough to a shaft journaled through the upstanding plates, with a rotatable handle anchored on said shaft located in a handle compartment between both strap compartments, the handle being in the form of a rectangular member which may be rotated to tighten the straps about books or other articles placed in the loop thereof, and a C member pivoted on the base plate into the pair of rotatable handles so as to cooperate through a recessed portion of either handle to lock the handle against rotation whereby the other portion of the rectangle provides a carrying handle.

With the above and related objects in view, this invention consists in the details of construction and combination of parts, as will be more fully understood from the following description, when read in conjunction with the accompanying drawing in which:

Fig. 1 is a side elevational view of the school book carrier.

Fig. 2 is a section view on line 2—2 of Fig. 1.

Fig. 3 is a top plan view.

Fig. 4 is a section view on line 4—4 of Fig. 1.

Fig. 5 is a section view on line 5—5 of Fig. 1.

Fig. 6 is a perspective view of the invention.

There is shown at 10 the article carrier of this invention as comprising an elongated base plate 12 having upstanding end plates 14 adjacent which there are a pair of parallel slots 16. On the other side of the parallel slots 16 from the end plates 14 are provided second upstanding plates 18, these second upstanding plates 18 being spaced substantially apart to provide a handle compartment 20. Located in this handle compartment 20 is a rotatable handle 22. This rotatable handle 22 consists of a pair of wire rods 24 whose ends form shafts 26 which extend through journal apertures 28 in each of the upstanding plates 14 and 18 and terminate in outturned ends 30 on the outer side of the end plates 14 to hold them in position.

The shaft portions 30 are secured together adjacent the journal apertures 28 as by welding or soldering at 32, and between these joined points 32 within each strap compartment 34, the wire rods 24 are spaced apart to have ends 36 of a loop strap 38 secured thereabout as shown.

Within the handle compartment 20, the wire rods 24 are formed into an elongated handle rectangle, with the shaft portions 26 extending from the middle of the short sides 40 of the rectangle handle, while hand grips 42 are provided on the long sides of the handle rectangle. A transverse recess 44 is provided at the mid point of each hand grip 42, and although shown as extending only across a portion of the hand grip 42, it may obviously be an annular recess about the mid point of the hand grip 42.

Arranged to cooperate with the transverse recess 44 on the hand grip 42 of the handle 22 is an angular C member 46 wherein one C end 48 is arranged to be received within the recess 44 of either hand grip 42, the other C end 50 being pivotally secured by a bracket 52 on the base plate 12, and held in position by an upturned end 54.

In operation, this article carrier 10 is particularly intended for carrying a series of articles, here shown as a couple of books 56.

In operation, the handle member 22 is rotated to extend the strap loops 38 through their slots 16 as far as necessary to receive the articles such as the books 56 therein. Then, the handle 22 is rotated in the opposite direction, rotating the shafts 26 and winding the straps 38 thereabout until the books 56 are tightly held therein against the bottom of the base plate 12. Then, the C member 46 is pivoted up from its position against the base plate 12 and the C end 48 is held while the handle 22 is allowed to rotate in reverse a part of the revolution causing the C end 48 to enter the recess 44 of one hand grip 42, with the other hand grip 42 thereby held vertically above it and spaced from it sufficiently for a hand to pass around and easily carry the hand grip 42 and thus carry the article carrier with its books 56 in position.

To release the books, the handle 22 is merely rotated again away from the C member 46 loosening the straps and permitting the books to be removed therefrom.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. An article carrier comprising an elongated base plate, an upstanding end plate at each end of said base plate, a pair of parallel strap slots in said base plate adjacent each end plate, a second upstanding plate on said base plate somewhat adjacent each end plate, each pair of parallel strap slots being located between an end strap and its somewhat adjacent second upstanding plate, said second upstanding plates being substantially spaced from each other providing a handle compartment therebetween, a rotatable strap tightening and holding handle in said handle compartment comprising an elongated rectangular handle member having strap carrying shafts extending from each short side thereof through journal apertures in each upstanding plate, a looped strap extending through each said pair of parallel slots and having its ends secured on one of said strap carrying shafts, and handle arresting means comprising an angular C member having one end of its C pivotally mounted on said base plate under said rotatable handle, the other end of said C being pivotal into the path of said rotatable handle to arrest and hold said handle against rotation, whereby articles placed in the loops of said looped straps may be secured therein by rotating said handle to rotate and tighten said looped strap ends on their securing shafts, and then said arresting C member may be pivoted to handle holding position, each long rectangle side of said handle member comprising a separate handle and holding member, and each having a transverse C member end receiving transverse recess at substantially the midpoint thereof, whereby when one handle and holding member cooperates with said C member end, the other provides a carrying handle, said rectangular handle member comprising a pair of wire rods joined in side-by-side relation at spaced apart points adjacent the shaft journal apertures, said wire rods being slightly spaced apart in the looped strap compartments to receive and hold a strap loop end thereon, said wire rods being substantially spaced apart into opposite sides of an elongated rectangle in said handle compartment.

2. The article carrier of claim 1, and a separate hand grip on each long side of said elongated rectangular wire rod portion, said C member end receiving recess being located in said hand grip.

References Cited in the file of this patent

UNITED STATES PATENTS

| | | |
|---|---|---|
| 221,616 | Rubin | Nov. 11, 1879 |
| 622,958 | Lay | Apr. 11, 1899 |
| 1,177,692 | Fallis | Apr. 4, 1916 |